United States Patent
Lodes

[11] 3,914,077
[45] Oct. 21, 1975

[54] APPARATUS FOR FORMING CURVILINEAR RESINOUS BUILDING STRUCTURES

[76] Inventor: Ralph R. Lodes, 45 Quentin Ave., Apt. 5B, New Brunswick, N.J. 08901

[22] Filed: May 15, 1974

[21] Appl. No.: 470,018

[52] U.S. Cl. .................. 425/60; 118/111; 239/177; 264/32; 425/64; 425/449; 425/470; 425/817 C
[51] Int. Cl.² .......................................... B29C 5/02
[58] Field of Search ........ 425/447, 4 C, 4 R, 817 C, 425/817 R, 449, 60, 470, 63, DIG. 14, 64; 52/2, 309; 249/65; 264/32, 35, 272, 279, 33, 34; 239/140, 177; 118/101, 108, 111, 323, 319, 258; 117/111 F

[56] References Cited
UNITED STATES PATENTS

| | | | |
|---|---|---|---|
| 2,877,530 | 3/1959 | Winn | 264/32 X |
| 2,979,798 | 4/1961 | Price | 425/60 |
| 3,016,595 | 1/1962 | Durst | 264/32 X |
| 3,487,508 | 1/1970 | Baumgartner et al. | 425/449 X |
| 3,511,695 | 5/1970 | Wright | 118/258 X |
| 3,548,453 | 12/1970 | Garis | 425/4 C |
| 3,668,287 | 6/1972 | Mackle | 425/4 R X |
| 3,776,990 | 12/1973 | Watkins et al. | 425/4 C X |

*Primary Examiner*—Robert D. Baldwin
*Assistant Examiner*—Mark Rosenbaum
*Attorney, Agent, or Firm*—Thomas J. Lannon

[57] ABSTRACT

An apparatus for the manufacture of building structures has a generally curvilinear shape and employs a rotatable scaffold supported a predetermined distance above the ground. The scaffold supports a carriage on which is mounted an applicator for material such as polyurethane foam or synthetic foam resin. The scaffold also supports a contour or profile smoothing member to smooth the surface of the building after the material has been applied. The material applicator is mounted on the carriage for reciprocal movement generally in a vertical direction as the scaffold rotates. Means are provided for controlling the rotational movement of the scaffold and vertical reciprocal movement of the material applicator on the carriage.

19 Claims, 7 Drawing Figures

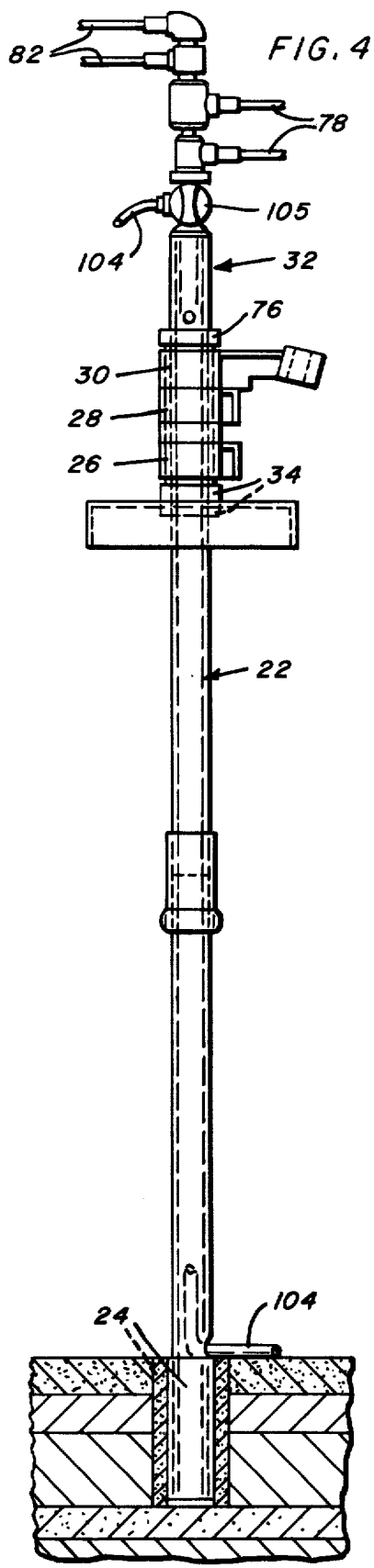
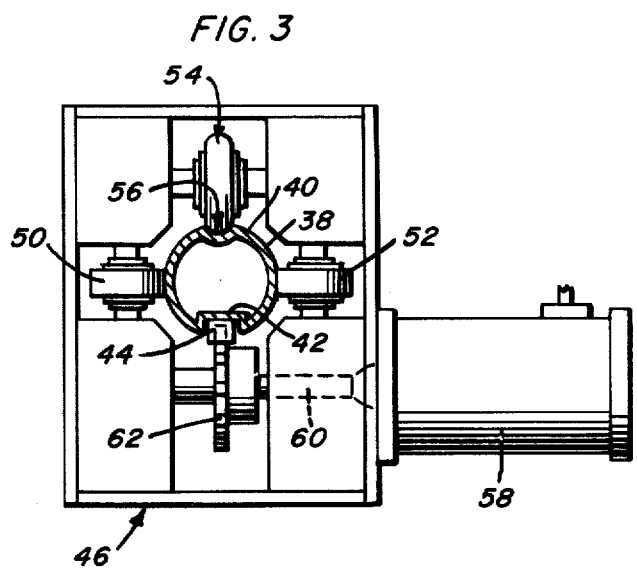

APPARATUS FOR FORMING CURVILINEAR RESINOUS BUILDING STRUCTURES

BACKGROUND AND OBJECTS OF THE INVENTION

This invention relates generally to the building industry and particularly the building of structures adaptable for dwelling or home use, as well as for buildings having industrial uses, such as warehousing, light manufacturing, service trades, meeting halls, exhibition halls, museums, and the like.

The population growth or "population explosion" as it is commonly called has caused much concern and activity in the housing and building industries. Particularly, new methods and procedures are constantly being sought to provide practical, low-cost, low maintenance structures for home use as well as for industrial purposes and other uses as specified above. Among the various techniques which have been utilized for low-cost construction and construction ease are the prefabrication methods for on-site assemblage, modular unit construction, as well as other time-saving, material and labor saving procedures and devices. These procedures and devices which have been tried and tested have not yet resulted in an apparatus or a system for producing building units which are low enough in cost and which can be produced quickly and with great facility to be able to accommodate the needs of the ever expanding population and ever increasing industrial needs. It is quite clear that housing units for people as well as building units for industry represent one of the largest undeveloped industrial markets in terms in meeting present and future needs of the population.

Moreover, the seriousness of the current energy crisis makes it imperative that architects and builders do everything possible to design and construct buildings both for dwelling purposes and industrial uses whereby fuel and other materials can be conserved and whereby maximum insulation and temperature control may be achieved. One way to accomplish the needs of energy conservation is to utilize a home or building structure made of polyurethane foam. Such building structures may be designed in a hemispheric, parabolic, circular, conical, or ellipsoidal shape. Only a fraction of heat escapes from such structures. Conventional structures which have cracks and corner areas generally have poor insulation properties.

My invention relates particularly to the application of materials, such as polyurethane foam or synthetic foam resin, in the construction of buildings for various uses such as dwelling, storage and warehouse purposes, meeting halls, theaters and the like. The invention is especially directed to a new concept in architecture, dealing particularly with dome-shaped structures for rapid construction with a minimum of materials and labor.

One of the principal objects of my invention is to facilitate the application of polyurethane materials in the fabrication and construction of buildings in various circular and curvilinear patterns, as well as the application of other protective and finishing materials to buildings previously erected.

Another object of my invention is the rapid construction of buildings of polyurethane and numerous other protective and finishing materials, having respective cylindrical, conical, parabolic, ellipsoidal and dome shapes.

In the quest for new techniques to be employed in the construction of buildings, experiments have been conducted with polyurethane foam as applied over fabricated, inflatable and removable forms and the feasibility of using such material has been clearly established. Buildings made of such material are readily adaptable to accommodate plumbing and heating units, provide for the comfort and convenience of the occupants as well as preserving the articles stored therein.

Polyurethane foam applied over fabricated or inflated forms has great potential and advantages in building construction for the following reasons among others: The polyurethane foam material may be sprayed very expeditiously. Spraying as in the instant invention allows thin layers of foam to be built up on a large surface without the need for expensive and complicated forms or framing. Additional layers can be sprayed almost immediately to build up the desired thickness.

Rigid urethane foam has several noteworthy properties and is of great versatility making it an excellent vehicle for building structure. Among its outstanding properties are its superior insulating efficiency. One-half as much rigid urethane foam is needed to give the same insulation as the next best building material. Polyurethane foam also retains its insulating efficiency for extremely long periods. Polyurethane foam is also a lightweight structural material. It has strong adhesive properties. As it foams, rigid urethane structurally bonds itself to many materials. The material also has a close cellular structure and does not absorb water. Polyurethane foam also permits a one step fabrication. Rigid urethane is applied and foams in place on the site. Fabrication of the structure and foam production occur simultaneously. The polyurethane building structure also eliminates the need for beams, joist or other traditionally used structural members employed in conventional building structures.

Another object of the invention is to employ apparatus which facilitates the application of polyurethane materials in the fabrication and construction of buildings.

A still further object of the invention is to employ an apparatus which is automatic or semi-automatic in operation and which can apply the polyurethane foam material in a continuous process to substantially construct the building in a continuous operation.

The invention will be better understood when considered with the following description thereof taken in conjunction with the accompanying drawings in which:

FIG. 3 is a plan view of the carriage assembly for the applicator nozzle and sensor;

FIG. 4 is a side elevational view of the vertical mast assembly per se;

Figure 1:
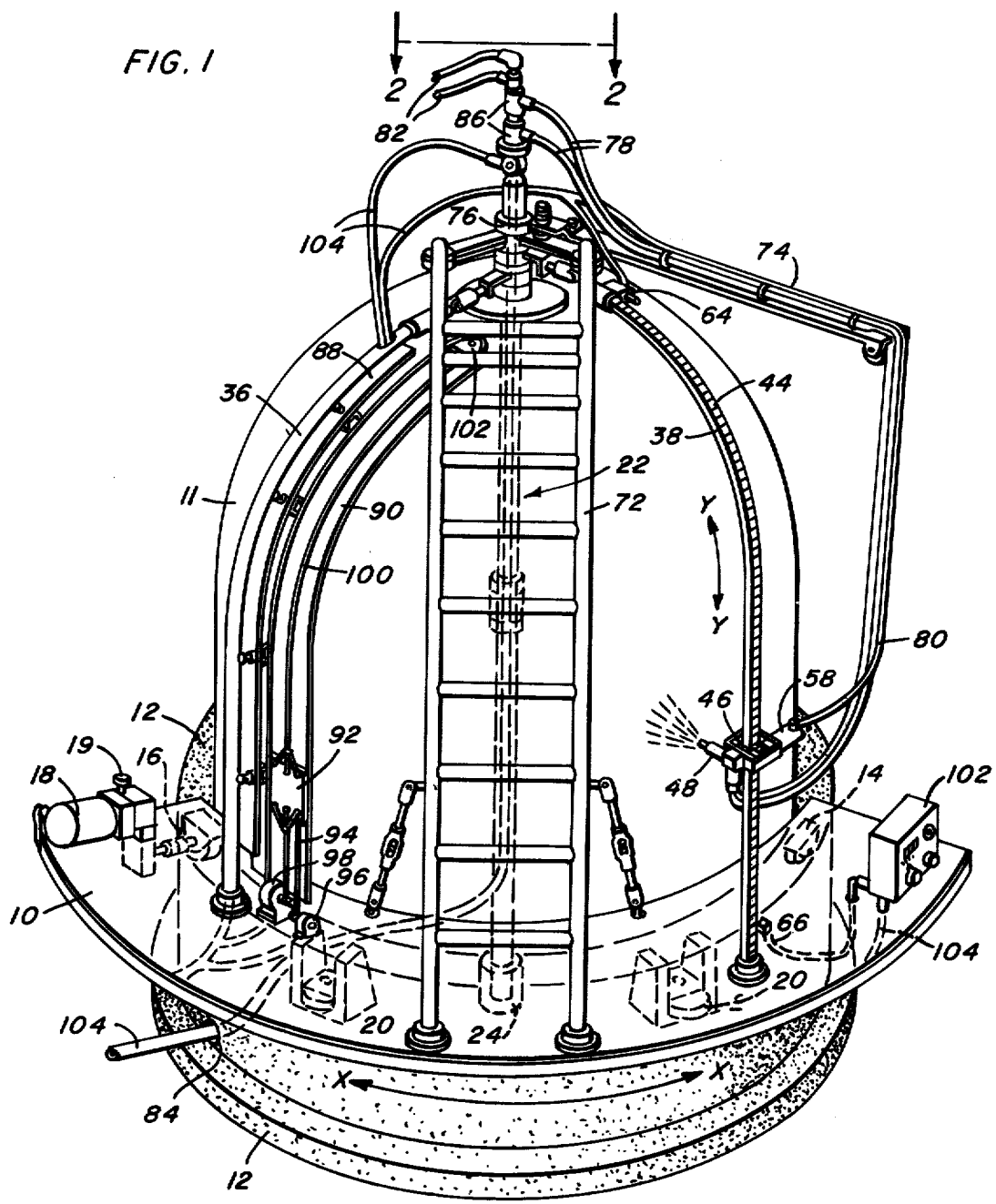
FIG. 1 is a perspective view illustrating the essential features of the apparatus for constructing a polyurethane foam building and includes the scaffold, the material applicator and the driving and carrying means therefor.
Figure 2:
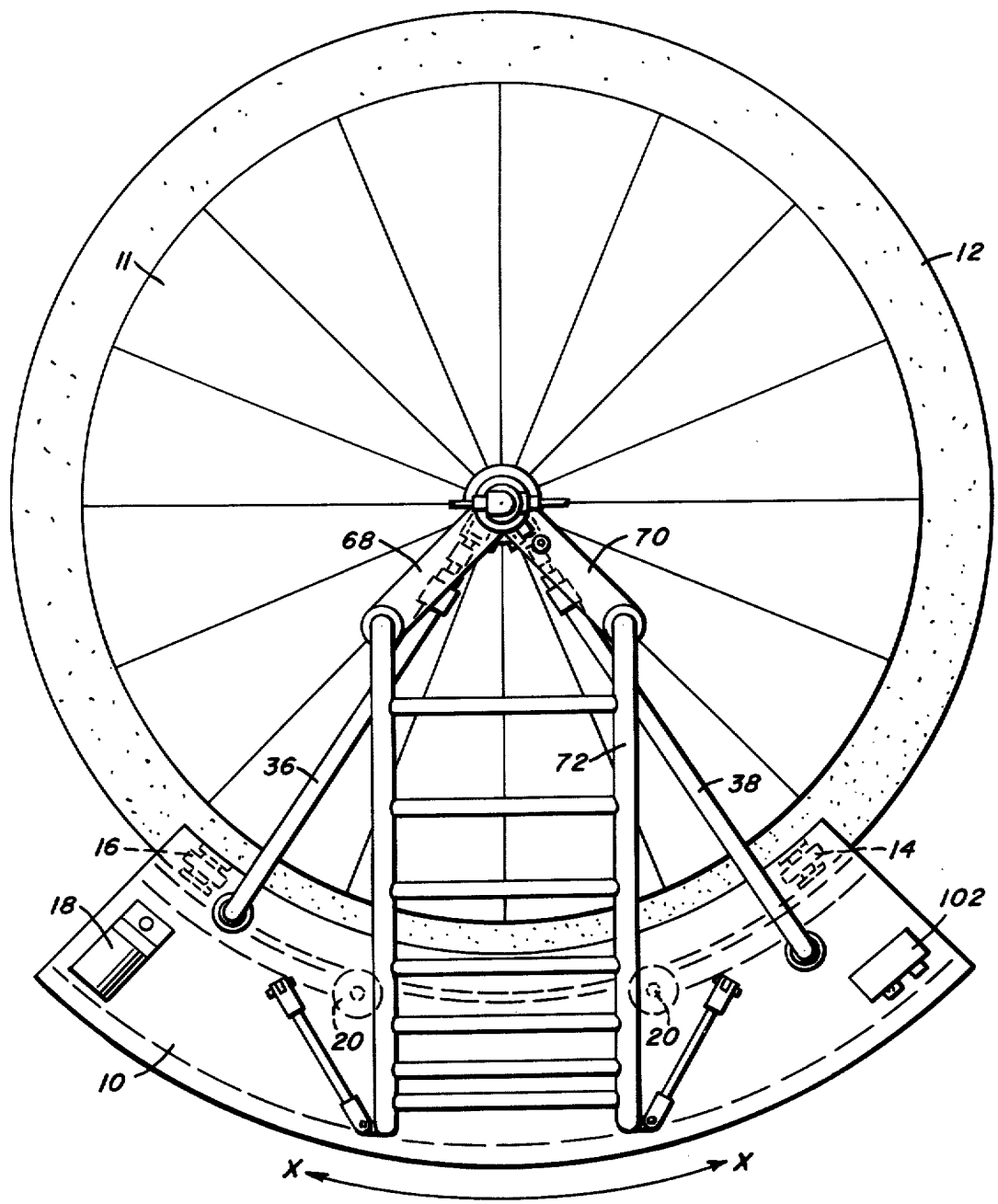
FIG. 2 is a top plan view taken along line 2—2 of FIG. 1.
Figure 5:
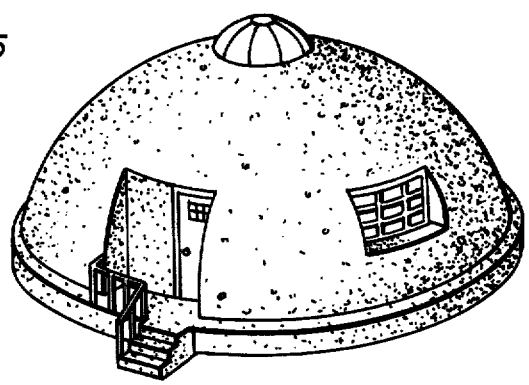
FIG. 5 is a perspective view of a building of generally hemispheric shape constructed in accordance with the invention.
Figure 6:
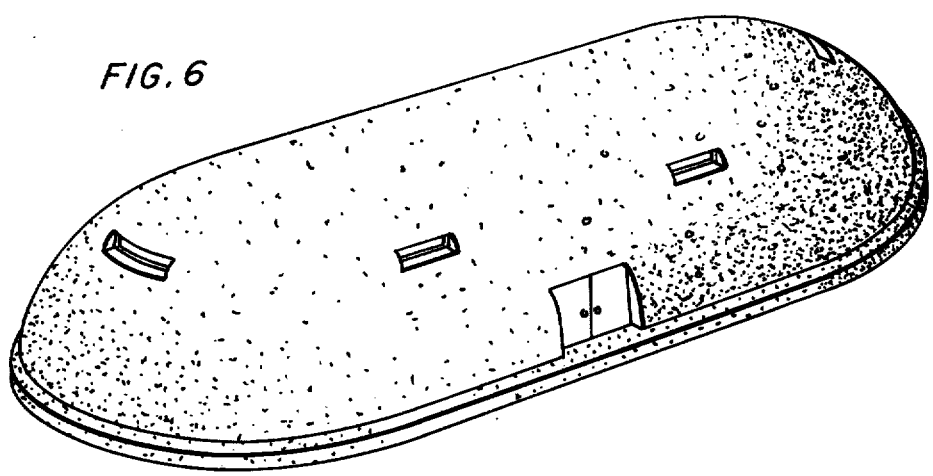
FIG. 6 is a perspective view of another form of building of ellipsoidal shape constructed in accordance with the invention.
Figure 7:
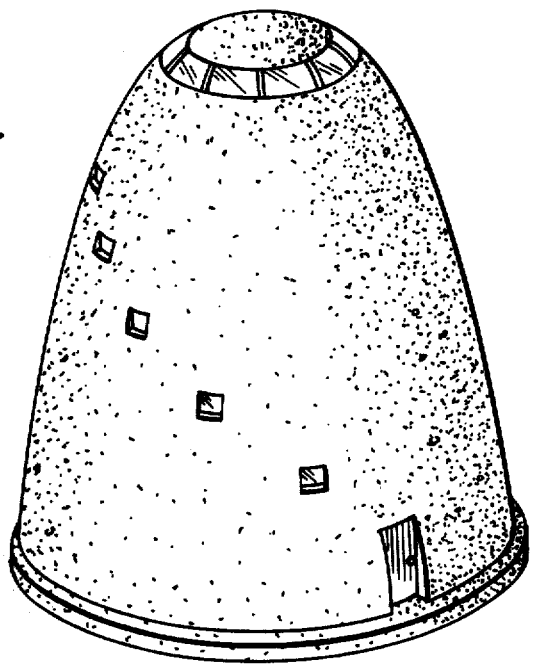
FIG. 7 is a perspective view of a paraboloidal form of building constructed in accordance with the invention.

In practicing the invention herein described, an inflatable form of vinyl plastic or other suitable material is positioned over a previously prepared building site and inflated to define an upwardly extending mold member. The inflated form may be of any suitable curvilinear shape and the hemispheric, ellipsoidal, and conical forms illustrated in the drawings are to be considered as examples. The apparatus constituting this invention is then associated with the thus inflated form in spaced relation thereto, as generally illustrated in FIG. 1, and connected to appropriate sources of electrical energy and a supply of foaming plastic resin, such as polyurethane resin, and various other protective coatings or finishes, which will ultimately be disposed over the form by a spraying technique.

The apparatus generally comprises a scaffold 10 mounted for rotation about the base of the inflated form 11 on an appropriate foundation 12. The scaffold further includes a plurality of roller means 14, 16 supporting the scaffold and its associated components on a portion of the foundation.

At least one of the roller means 16 is driven by means of a variable speed motor 18 coupled to the roller 16 to propel the scaffold around the inflated form. Suitable speed control means 19 may be utilized to vary the speed at which the scaffold is driven. In order to stabilize the scaffold on the foundation, a pair of guide wheels 20 are disposed beneath the scaffold and in contact with a portion of the side wall of the foundation.

A vertically extending hollow mast 22 is disposed at the axis of the foundation and extends upwardly through the uppermost center portion of the form. The mast may include a plurality of interconnected sections which will enable the user to select an appropriate height in accordance with the size of the inflatable form employed. An appropriate sleeve or other mounting means 24 is disposed adjacent the axis of the foundation to provide support for the mast.

The upper extremity of the mast 32 extends above the inflated form to accommodate a plurality of yoke assemblies 26, 28, 30, which are disposed in stacked pivotal relationship, one above the other and supported on the mast at the desired height by means of a mast encircling collar 34. Rotation of the yoke assemblies about the mast may be facilitated by the use of suitable bearings if desired. A pair of tubular support elements 36, 38 are carried by the scaffold 10 and extend upwardly in spaced relation to the inflated form and include arcuate portions complementary to the shape of the inflated form to connect with two of the yoke assemblies 26 and 28, respectively. The tubular support element 38 is provided with a pair of oppositely disposed channels 40 and 42 formed on the outermost and innermost faces of the tubular support element 38, as best seen in FIG. 3 of the drawings. The outermost channel 42 is configured to receive cog means, preferably in the form of a sprocket chain 44 which extends substantially the full length of the tubular support element 38.

A carriage unit 46 supports a combination applicator and sensing device 48 for reciprocable vertical movement along the tubular support element 38. The carriage includes a plurality of support engaging rollers 50, 52 disposed on opposite sides of the tubular support element at approximately 90° to the aforementioned channels. A third roller 54 is supported by the carriage and includes a portion 56 complementary to and disposed within the channel 40 on the innermost face of the tubular support element.

A variable speed reversible motor 58 is mounted on the carriage and is provided with a sprocket shaft 60 mounting a sprocket wheel 62 positioned to engage the links of the sprocket chain 44.

As best seen in FIGS. 1 and 3, the carriage 46 encircles the tubular support element 38 and is stabilized thereon by the cooperative action of the carriage rollers 50, 52, 54, and the sprocket wheel 62.

A motor reversing limit switch 64 is mounted adjacent the upper end of the tubular support 38 and a similar reversing limit switch 66 is disposed adjacent the lower end. Thus, the carriage may automatically reciprocate up and down along the support as material is sprayed from the applicator as will be described hereinafter.

A pair of outwardly radiating arms 68, 70 are carried by the uppermost yoke 30 and provide support means for the upper ends of the stiles of a ladder 72. The lower ends of the stiles are mounted on the scaffold.

A spring loaded hose support 74 is rotatably mounted on the mast immediately atop the yoke 30. A collar 76 is employed to retain (hold down) the three yokes and their respective assembled components 36, 72, and 44. The hose holder extends radially outwardly from the mast and provides resilient support means for the material supply hoses 78 which are entrained over the hose support and depend from the free end thereof to the applicator-sensor element 48. Similarly, a power line 80 is supported by the hose holder and is connected at one end to the reversible motor 48 on the carriage 46.

The components of the foaming plastic material which is to be deposited on the inflated form are supplied from conveniently positioned spray apparatus (not shown) and are fed through a dual hose assembly 82 which extends from the spray apparatus to a pair of rotatable manifolds 86. The dual hose assembly is at a height compatible to the height of the manifolds so as to clear the sweep of the applicator apparatus of FIG. 1. The dual hoses interconnect with the pair of manifolds 86, to which the other ends of the material supply hoses 78 are attached. The manifolds, like the yokes 26, 28, and 30, are mounted to rotate about the mast so that a supply of material may be delivered to the applicator throughout a full 360° circle about the mast. Material under pressure may thus be supplied to the hose assembly and conducted therethrough for spray application through the applicator-sensor as desired.

A profile forming unit, generally illustrated at 88, includes a contour plate 90 supported by any suitable means from the tubular support element 36 and extends upwardly from the scaffold to a point adjacent the upper extremity of the form. The contour plate 90 is generally configured to complement the shape of the inflatable form and is positioned in spaced relation thereto to accommodate the desired thickness of the material applied to the form by the applicator. The contour plate 90 is adjustably positioned to contact the outer surface of the applied plastic resin and to impart thereto a smooth finish of substantially uniform characteristic. If desired, contour plates having a stepped or saw-tooth configuration may be employed to impart to the finished surface a lap-board appearance.

A reciprocating heating element 92 is connected to a source of electrical energy by means of a reeled power cord 94 extensible and retractable from the reel 96 which is in turn connected to a suitable source of electrical energy. The heater 92 may be vertically adjusted along the contour plate by means of a motor 98 connected to the heating element through a cable 100 entrained about a pulley 102 at the uppermost end of the contour unit. Appropriate limit switches (not shown) may be employed to effect automatic reciprocation of the heater 42 along the contour plate 90 by alternately reversing the direction of rotation of the motor 98. Thus, it may be seen that as the scaffold rotates about the inflated form and material is applied thereto by the applicator, the desired finish may be imparted to the outer surface of the applied material by contact with the contour plate acting in the capacity of "screed" or trowel. Simultaneously, the heater 42 may be employed to maintain the contour plate at a preselected temperature during the profiling operation.

The speed at which the scaffold is driven by the motor 18 may be coordinated with the speed at which the applicator-sensor carriage is reciprocated along the tubular element and both or either of these speeds may be coordinated with the flow of material delivered to the applicator in order to provide an optimum and coordinated delivery rate over the surface of the form. The sensing device combined with the applicator is responsive to the characteristics of the applied plastic resin with particular emphasis on the thickness and uniformity of the coat in order to control the speed of the scaffold and carriage motors and the flow of material to the applicator.

As an example, the sensing device could include a gamma ray beam directed at the coated surface which will respond to the variations in distance between the uncoated and coated portions of the form and subsequently effect changes in an electrical signal applied to an amplifier (not shown) and related to a converter (not shown) to regulate the speed control units for the motors 18, 58, 98 and the flow of materials to the applicator. The particular sensing probe together with the electrical components associated therewith are of conventional design and form no part of this invention, but are illustrated generally at 102 as a control device. The various electrical components of the apparatus are interconnected by appropriate cable harnesses and connectors as illustrated at 104. The power extends from an appropriate opening 84 in the foundation 12 and thence upward into the interior of the mast. The power input cable 104 supplies all electrical power to the various components by way of the rotating electrical cord assembly 105.

If desired, a fabric covering (not shown) may be disposed over the entire form prior to the application of the foamed resin in order to provide a fabric inner surface on the molded product once the inflated form has been deflated and removed.

Depending upon the nature of the building being constructed with due consideration for climatic conditions, loads to be imposed thereagainst, and other environmental considerations, upright and/or horizontal reinforcement bars may be disposed around and over the form prior to the application of the foamed plastic to provide additional reinforcing capabilities to the finished structure. It is contemplated that these elements would be embedded within the applied form and thus produce no deleterious appearance to the finished construction.

It is also contemplated that various service wiring and plumbing components may be positioned adjacent the form to also be embedded in the foam material and thus completely concealed, except, of course, at those predetermined points where access for subsequent connection to electrical and plumbing appliance devices is desired.

It is further contemplated that appropriate modules for window and door openings may be positioned adjacent the form prior to the application of the foam to accommodate provision of these facilities as needed, while rendering the same integral parts of the basic building construction.

Experimentation has indicated that foam applications on the order of 3 to 5 inches in thickness may be successfully manipulated by the technique herein described, although it is emphasized that these dimensions are provided by way of example and not as limitations.

The outer surface of the foamed resin shell may be coated with any appropriate protective and weather resisting material and may include decorative as well as functional finishes to impart a pleasing and environmentally acceptable appearance.

OPERATION

In operation it will be recognized that actuation of the variable speed motor 18 to drive the roller 16 will propel the scaffold in a circular path on the foundation. As seen in FIG. 1 of the drawings the path of movement of the scaffold is illustrated by the line X—X.

Similarly, actuation of the motor 58 will result in vertical movement of the applicator-sensor carriage 46 on the tubular element 38 along the lines Y—Y of FIG. 1.

Upon actuation of the appropriate power means to drive both the scaffold 10 and the applicator-sensor carriage 46 and control simultaneous delivery of materials to the applicator, selected patterns of delivery of material may be effected to the inflated form 11. As an example, simultaneous actuation of the scaffold and applicator carriage will produce a spiral pattern of material delivered to the surface of the inflated form as the scaffold rotates about the mast and the carriage reciprocates along the tubular support element 38.

The X- and Y-motion and the material flow rate will be coordinated by signals from a sensing device carried by the applicator-sensor carriage to provide a uniform distribution of material over the entire surface of the inflated form. In such a fully automated system, signals from the sensing probe may be responsive to the thickness of the applied material to ensure uniformity of application or if desired, variations in the thickness of the application.

Obviously, it is within the scope and contemplation of this invention that the scaffold and applicator-sensor carriage may be manipulated independently where desired to apply material to a preselected area exclusively.

I claim:

1. An apparatus for forming a curvilinear building structure of foam resin on an internally positioned inflated form member having a desired building configuration, said apparatus including scaffold means, means supporting said scaffold means above the ground adjacent to and externally of said inflated member for rotational movement about a generally vertical axis through said inflated member, said scaffold means having a platform portion shaped to generally conform to a portion of the outer face of the inflated member adjacent the lower portion thereof, said platform portion carrying a foam resin applicator assembly, said assembly comprising an elongated support means, an applicator head reciprocally mounted on said support means, said support means extending upwardly from said platform portion and spaced from but generally following the contour of said inflated member, means for rotating said scaffold means circumferentially around the lower portion of said inflated form member in a generally horizontal plane, means for moving the applicator head reciprocally and vertically along said support means, means for feeding foam resin material to said applicator head, and a contour plate mounted on said scaffold means trailing said applicator assembly in the direction of rotation of said scaffold means, said contour plate being curvilinearly shaped to conform to the desired outline of the building configuration extending vertically along substantially the entire height of said form in close juxtaposition to the inflated member to smooth the foam resin progressively applied thereto in order to provide an even outer surface thereto.

2. The apparatus of claim 1 wherein means are provided for regulating the speed of rotation of said scaffold means.

3. The apparatus of claim 1 including a vertical shaft assembly disposed through the vertical center of said inflated member, means supporting said shaft assembly on the ground at one end, and said shaft assembly having its other end projecting above said inflated shape, said support means being rotatably supported at one end on the projecting end of said shaft assembly.

4. The apparatus of claim 3 and further including conduit means swivelly mounted on the projecting end of said shaft assembly, means connecting said conduit means to applicator head, and means to support said conduit means out of contact with the inflated member.

5. The apparatus of claim 1 wherein the means for moving the applicator head reciprocally includes a carriage unit disposed about said support means for reciprocal travel therealong, said applicator head being mounted on said carriage unit.

6. The apparatus of claim 5, and further including cog means secured along the outer surface of said support means, motor means mounted on said carriage unit and having a shaft extending therefrom, a sprocket wheel secured to said shaft and in engagement with said cog means.

7. The apparatus of claim 5 wherein said cog means is a sprocket chain.

8. The apparatus of claim 6, wherein said motor means is a reversible electric motor and further including limit stop means adjacent the extremities of the support means and operable upon contact with the carriage unit to reverse said motor.

9. The apparatus of claim 6 and further including a channel on the inner surface of said support means and guide roller means on said carriage adapted to engage said channel to guide the carriage unit during its travel along said support means.

10. The apparatus of claim 1 and further including a foundation on the ground surrounding the inflated form, and wherein said means for rotating said scaffold means comprises a motor mounted on the scaffold means, a drive roller driven by said motor, said roller being movable on a portion of said foundation.

11. The apparatus of claim 10, wherein said motor is of the variable speed type, and control means on said scaffold means to vary the speed of the scaffold mounted motor.

12. The apparatus of claim 1, wherein said inflated form member is paraboloidal in shape.

13. The apparatus of claim 1, wherein said inflated form member is hemispherical in shape.

14. The apparatus of claim 1, wherein said inflated form member is ellipsoidal in shape.

15. The apparatus of claim 6, and further including control means on said scaffold means to vary the speed of said carriage-mounted motor to regulate the reciprocatory movement of the carriage unit.

16. The apparatus of claim 1 and further including a second elongated support means extending upwardly from said platform portion, said contour plate being mounted on said second support means.

17. The apparatus of claim 1, and further including means to heat said contour plate.

18. The apparatus of claim 17, wherein said means to heat said contour plate comprises an electrical heating element reciprocable along the outer surface of said contour plate.

19. The apparatus of claim 18 and further including second motor means mounted on said scaffold means, and means interconnecting said second motor means and said heating element whereby said heating element will be moved reciprocably along the contour plate.

* * * * *